US012327439B2

(12) United States Patent
Chau et al.

(10) Patent No.: US 12,327,439 B2
(45) Date of Patent: Jun. 10, 2025

(54) VEHICLE DIAGNOSTIC SYSTEM AND RELATED METHODOLOGY DEPLOYABLE AT VEHICLE SERVICE FACILITY

(71) Applicant: INNOVA ELECTRONICS CORPORATION, Irvine, CA (US)

(72) Inventors: Hoa Chau, Irvine, CA (US); Phuong Pham, Fountain Valley, CA (US); Bruce Brunda, Newport Beach, CA (US)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 0 days.

(21) Appl. No.: 18/643,567

(22) Filed: Apr. 23, 2024

(65) Prior Publication Data
US 2024/0321019 A1   Sep. 26, 2024

Related U.S. Application Data

(63) Continuation-in-part of application No. 16/952,323, filed on Nov. 19, 2020, now abandoned.
(Continued)

(51) Int. Cl.
*G07C 5/00* (2006.01)
*G06K 7/14* (2006.01)
*G07C 5/08* (2006.01)

(52) U.S. Cl.
CPC ........... *G07C 5/008* (2013.01); *G06K 7/1417* (2013.01); *G07C 5/006* (2013.01); *G07C 5/0808* (2013.01); *G07C 2205/02* (2013.01)

(58) Field of Classification Search
CPC ...... G07C 5/008; G07C 5/006; G07C 5/0808; G07C 2205/02; G06K 7/1417
See application file for complete search history.

(56) References Cited

U.S. PATENT DOCUMENTS 6,807,469 B2   10/2004   Funkhouser et al.
6,925,368 B2    8/2005   Funkhouser et al.
(Continued)

FOREIGN PATENT DOCUMENTS

CN    105564162 B  *  7/2018  ......... B60C 23/0481
KR   20110041158 A  *  4/2011
WO   WO2016153238      9/2016

OTHER PUBLICATIONS

"Jie, Hu; Fuwu, Yan; Jing, Tian; Pan, Wang; Kai, Cao; Developing PC-Based Automobile Diagnostic System Based on OBD System; 2010; Wuhan University of Technology" (Year: 2010).*

*Primary Examiner* — Russell Frejd
*Assistant Examiner* — Christopher R Cardimino
(74) *Attorney, Agent, or Firm* — Stetina Garred Brucker & Newboles

(57) ABSTRACT

A drive-through vehicle diagnostic system for use in a drive-through track of a facility includes an offer generating module capable of presenting an offer to a user adjacent the track and receiving user input associated with a selected offer. A remote server is in communication with the offer generating module and is capable of generating a diagnostic procedure associated with the selected offer. The diagnostic procedure includes a prescribed data retrieval instruction and a prescribed diagnostic summary instruction. A scan tool is connectable with a vehicle and is configured to receive the prescribed data retrieval instruction and retrieve diagnostic data from the vehicle in accordance with the prescribed data retrieval instruction while the vehicle proceeds along the track. The remote server is configured to receive the retrieved diagnostic data and analyze the diagnostic data to generate a diagnostic summary in accordance with the prescribed diagnostic summary instruction.

34 Claims, 8 Drawing Sheets

Related U.S. Application Data

(60) Provisional application No. 62/981,712, filed on Feb. 26, 2020.

(56) References Cited

U.S. PATENT DOCUMENTS

| | | | |
|---|---|---|---|
| RE39,619 E | 9/2007 | Andreason et al. | |
| 7,376,497 B2 | 5/2008 | Chen | |
| RE40,798 E | 6/2009 | Chen | |
| RE40,799 E | 6/2009 | Chen | |
| 7,620,484 B1 | 11/2009 | Chen | |
| 7,734,390 B2 | 6/2010 | Chen | |
| 8,019,503 B2 | 9/2011 | Andreasen et al. | |
| 8,024,083 B2 | 9/2011 | Chenn | |
| 8,032,419 B2 | 10/2011 | Chenn | |
| 8,060,247 B2 | 11/2011 | Kaplan et al. | |
| 8,068,951 B2 | 11/2011 | Chen et al. | |
| 8,301,329 B2 | 10/2012 | Andreasen et al. | |
| 8,306,687 B2 | 11/2012 | Chen | |
| 8,370,018 B2 | 2/2013 | Andreasen et al. | |
| 8,825,270 B2 | 9/2014 | Chen | |
| 8,880,274 B2 | 11/2014 | Chenn | |
| 8,909,416 B2 | 12/2014 | Chen et al. | |
| 9,014,908 B2 | 4/2015 | Chen et al. | |
| 9,026,400 B2 | 5/2015 | Chen et al. | |
| 9,117,319 B2 | 8/2015 | Chen et al. | |
| 9,141,503 B1 | 9/2015 | Chen | |
| 9,142,066 B2 | 9/2015 | Chen et al. | |
| 9,177,428 B2 | 11/2015 | Nguyen et al. | |
| 9,240,079 B2 * | 1/2016 | Lambert | G07C 5/008 |
| 9,324,194 B2 | 4/2016 | Pham | |
| 9,324,196 B2 | 4/2016 | Elliott et al. | |
| 9,342,934 B2 | 5/2016 | Chen | |
| 9,384,599 B2 | 7/2016 | Chen et al. | |
| 9,454,854 B2 | 9/2016 | Easterly et al. | |
| 9,646,432 B2 | 5/2017 | Madison et al. | |
| 9,761,062 B2 | 9/2017 | Chen | |
| 9,824,507 B2 | 11/2017 | Chen | |
| 9,892,568 B2 | 2/2018 | Chen et al. | |
| 10,163,281 B2 | 12/2018 | Le et al. | |
| 10,462,225 B2 | 10/2019 | Chen et al. | |
| 2005/0060070 A1 | 3/2005 | Kapolka et al. | |
| 2009/0144151 A1 * | 6/2009 | Pajot | G06Q 40/12 |
| | | | 705/14.62 |
| 2012/0182939 A1 * | 7/2012 | Rajan | A61B 5/002 |
| | | | 370/328 |
| 2013/0134214 A1 * | 5/2013 | Williams | G07G 1/12 |
| | | | 235/375 |
| 2014/0225620 A1 * | 8/2014 | Campbell | B60L 58/12 |
| | | | 324/426 |
| 2014/0340231 A1 * | 11/2014 | Stukenberg | G06F 3/0482 |
| | | | 715/739 |
| 2015/0269788 A1 * | 9/2015 | Elliott | G06Q 20/18 |
| | | | 701/31.4 |
| 2016/0140649 A1 * | 5/2016 | Kleve | H04W 12/06 |
| | | | 705/307 |
| 2018/0151003 A1 * | 5/2018 | Grobler | G05B 23/0216 |
| 2019/0019356 A1 * | 1/2019 | Liu | G05B 23/0283 |
| 2019/0066425 A1 * | 2/2019 | Davis | G07C 9/00309 |
| 2020/0007810 A1 * | 1/2020 | Hoevenaar | H04N 21/4316 |
| 2020/0388363 A1 * | 12/2020 | Docktor | G16H 10/60 |
| 2021/0016786 A1 | 1/2021 | Griffiths et al. | |
| 2021/0049836 A1 * | 2/2021 | Covington | G07C 5/085 |

* cited by examiner

VEHICLE DIAGNOSTIC SYSTEM AND RELATED METHODOLOGY DEPLOYABLE AT VEHICLE SERVICE FACILITY

CROSS-REFERENCE TO RELATED APPLICATIONS

This application is a continuation-in-part application of U.S. application Ser. No. 16/952,323, filed Nov. 19, 2020, which claims priority to U.S. Application Ser. No. 62/981,712 filed Feb. 26, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to vehicle diagnostics, and more specifically, to a diagnostic system integrated into a facility accessible by a vehicle, such as a gas station, carwash, etc.

2. Description of the Related Art

Owning and operating a vehicle over a period of time typically requires maintenance and repair. Conventionally, maintenance and repair services were offered at a dealership or a repair shop, where the vehicle may be inspected by a mechanic to identify any necessary repairs or fixes, and make such repairs or fixes.

While conventional vehicle repair services may be an effective approach for maintaining and repairing a vehicle, there are various drawbacks associated with this conventional approach. One drawback is that the conventional approach tends to be reactive (e.g., occurring after discernable symptoms are present on the vehicle), as opposed to proactive (e.g., occurring prior to discernable symptoms being present on the vehicle). A reactive approach may result in more serious issues being present on the vehicle, which may entail more costly repairs. More serious issues may also make the vehicle unsafe to operate until such repairs are completed. A proactive approach may identify issues when they are minor and allow such minor issues to be addressed before they become more serious issues.

Another drawback with conventional vehicle repair services is that they require dedicated time to complete the repairs. An operator of a vehicle may drive the vehicle to the repair shop/dealership and wait to have the repairs completed. Many vehicle operators are not willing to take time out of their schedule to complete the repairs unless the repairs are absolutely necessary, e.g., the vehicle will not operate unless the repairs are completed.

Some vehicle owners have an interest in maintaining and repairing their vehicle on their own, e.g., do-it-yourself, and thus, such individuals may invest in tools that may be needed to identify vehicle problems and complete necessary repairs. However, vehicle owners that lack an interest or the necessary tools may not be able to maintain or repair their vehicle on their own.

Accordingly, there is a need in the art for a diagnostic system that provides access to diagnostic information related to operation of a vehicle, without the need to purchase diagnostic equipment, or bring the vehicle to an automotive repair facility. Various aspects of the present disclosure address this particular need, as will be discussed in more detail below.

BRIEF SUMMARY

In accordance with one embodiment of the present disclosure, there is provided a vehicle diagnostic system that may be incorporated into a drive-through facility (e.g., carwash) or stop-and-go facility (e.g., gas station). When entering the facility, the customer may be given a scan tool, which may be plugged into a diagnostic port on the vehicle. The scan tool and/or the vehicle may be operatively linked to a customer's profile established through a previous registration process. In other embodiments, customer information may be obtained from a self-serve kiosk or derived from scanning a bar code, or QR code or alphanumeric license plate associated with the vehicle. The ability of an operator of a diagnostic system to interface with vehicle owners during a routine stop (e.g., while pumping gas), may allow for increased access to automotive diagnostics.

According to one embodiment, there is provided a method of providing vehicle diagnostics for a plurality of vehicles. The method includes creating, at a remote server, a plurality of customer profiles associated with a plurality of diagnostic dongles and a plurality of vehicles. Each customer profile includes a unique identifier associated with a respective one of the plurality of diagnostic dongles and is correlated to a unique identifier associated with a respective one of the plurality of vehicles. The method additionally includes receiving vehicle data at the remote server, with the vehicle data being retrieved by the plurality of diagnostic dongles from the plurality of vehicles. The vehicle data received from each vehicle is analyzed to derive diagnostic information concerning vehicle operation, e.g., a most likely solution, which is associated with each customer profile. The method additionally includes receiving a plurality of return signals at the remote server, with each return signal being associated with a respective one of the plurality of customer profiles and being indicative of the diagnostic dongle associated with the respective customer profile having been returned to a prescribed location. The method also includes transmitting a plurality of diagnostic reports. Each diagnostic report is associated with a respective one of the plurality of customer profiles and is transmitted in response to receipt of the respective one of the plurality of return signals associated with the corresponding customer profile. Each diagnostic report preferably includes the most likely solution and is transmitted to a prescribed electronic address associated with the customer profile.

The method may include the step of generating the return signal in response to scanning a visual code on the diagnostic dongle with a scanner associated with the prescribed location.

The method may comprise displaying information related to the analyzing step on a display at the prescribed location.

The receiving step may include receiving several sets of vehicle data retrieved from the vehicle, with each set of vehicle data being retrieved from the vehicle at a respective retrieval time. The analyzing step may include collectively analyzing the multiple sets of vehicle data from a vehicle to determine the most likely solution.

The method may include the step of entering the unique identifier associated with a respective dongle by scanning a visual code on the dongle. The scanning step may include scanning a barcode on the dongle or scanning a QR code on the dongle.

The method may include the step of entering the unique identifier associated with a respective vehicle by scanning a visual code or license plate on the vehicle.

The unique identifier associated with at least one vehicle may include an electronic vehicle identification number (VIN), and the method may further include the step of retrieving the electronic vehicle identification number using a respective one of the plurality of diagnostic dongles.

The method may also comprise the step of printing at least one of the diagnostic reports at the prescribed location.

According to another embodiment, there is provided a method of providing vehicle diagnostics for a vehicle. The method includes creating a customer profile at a remote server. The customer profile including a unique identifier associated with a diagnostic dongle correlated to a unique identifier associated with a vehicle of a customer. The method additionally includes receiving vehicle data at the remote server, with the vehicle data being retrieved by the diagnostic dongle from the vehicle. The vehicle data is analyzed to determine a most likely solution. The method further comprises receiving a return signal at the remote server indicative of the diagnostic dongle being returned to a prescribed location. In response to receipt of the return signal, a diagnostic report is transmitted, with the diagnostic report including the most likely solution in response to receipt of the return signal, the diagnostic report being transmitted to a prescribed electronic address associated with the customer.

In the case of a drive-through facility, the scan tool or dongle may be configured to access and retrieve data from the vehicle while the vehicle sits in or proceeds through the facility. Any data retrieved by the scan tool may be uploaded to a remote diagnostic server for diagnostic analysis.

The diagnostic summary may be generated based on the analysis of the data and delivered to the customer at the facility, or electronically by text message (e.g., sms message) or email. Before leaving the drive-through facility, the customer may unplug the scan tool/dongle and leave it at the facility.

The ability to integrate automotive diagnostics into drive-through and/or stop-and-go facilities may provide improved access to vehicle diagnostic systems and methods to many drivers. The diagnostic system may be utilized during the normal course of operating the vehicle, and thus, many drivers may feel more inclined to utilize such a system. As such, drivers who utilize the diagnostic system may not feel the need to purchase a scan tool/dongle for themselves; rather, the scan tool/dongle may be temporarily borrowed or used when passing through a drive-through facility or between visits to one or more stop-and-go facilities.

As noted above, the drive through facility may include a camera for capturing vehicle identification information on the vehicle passing through the drive-through facility, such as a license plate, vehicle identification number, transponder signal or cellphone signal, any of which may be utilized to access the customer profile (customer account).

The scan tool may include a short-range communication circuit, such as WiFi® or Bluetooth®. The scan tool may also include a long-range communication circuit, such as a cellular communication circuit.

The diagnostic summary may be communicated to a smartphone or to an electronic address associated with the customer, such as an email address or telephone number.

According to another embodiment, there is provided a drive-through vehicle diagnostic method comprising the steps of generating a request to initiate a commercial transaction at a kiosk or other transaction server. An offer is generated for a customer of the commercial transaction subsequent to receipt of the request upon initiation of the commercial transaction at the kiosk, with the offer being associated with vehicle diagnostic services. The method may include entering customer identification information, which may include billing information, at the kiosk in connection with requested vehicle diagnostic services. Vehicle identification information may also be received at the kiosk, with the vehicle identification information being associated with the received customer identification information. A dongle/scan tool may be provided to the customer via the kiosk (e.g., dispensed), via an area adjacent the kiosk (e.g., from a basket), or via an attendant near the kiosk. The method may further include receiving customer identification information, vehicle identification information, billing information and vehicle data at the remote server and analyzing the vehicle data at the remote server in accordance with the requested diagnostic services to determine a most likely solution.

The method may include communicating the most likely solution from the remote server to a kiosk and/or an electronic device, such as a cellphone, for display to the customer.

The step of generating a request to initiate a commercial transaction may occur automatically in response to a request for services other than vehicle diagnostic services, such as carwash services, oil change services, banking services, etc., as well as non-drive through services where the vehicle may be temporarily left at a location, e.g., smog testing facilities, tire repair/replacement facilities, etc.

Another aspect of the present disclosure is directed towards a drive-through diagnostic system for providing a user with vehicle-specific information upon completion of the user traversing a path at a drive-through facility. The drive-through diagnostic system comprising a dongle configured to be connectable with a vehicle electrical system to retrieve vehicle data therefrom. The dongle is configured to implement at least one dongle functionality in response to receipt of a wireless dongle enabling signal. The system additionally includes a communication system configured to communicate the wireless dongle enabling signal when the dongle is within a defined area associated with the drive-through facility, and generate a dongle return signal in response to return of the dongle to a prescribed return area. The generation of the dongle return signal is a precondition for transmission of a diagnostic report including the vehicle-specific information, with the diagnostic report being derived from the retrieved vehicle data.

The communication system may be configured to communicate a dongle disable signal to the dongle for disabling the at least one dongle functionality. The dongle disable signal may be communicated a prescribed period of time subsequent to the communication of the dongle enabling signal.

According to another embodiment, there is provided a functionally-enablable vehicle diagnostic dongle configured for use with a dongle enabling device configured to generate a wireless dongle enabling signal associated with a defined area. The dongle includes a vehicle communication port configured to be connectable with a vehicle to retrieve vehicle data therefrom. A remote communication circuit is configured to send and receive signals to at least one remote device. A processor is in communication with the vehicle communication port and the remote communication circuit. The processor is configured to receive the dongle enabling signal via the remote communication circuit from the dongle enabling device and implement at least one dongle functionality in response to receipt of the dongle enabling signal. The at least one dongle functionality is selected from the list including receiving vehicle data at the dongle, and uploading the vehicle data from the dongle to a remote device for diagnostic processing.

The processor may be configured to implement the at least one dongle functionality for a prescribed period of time.

The at least one dongle functionality may be a communication functionality.

According to another embodiment, there is provided a non-transitory program storage medium on which are stored instructions executable by a processor or programmable circuit of a mobile communication device to perform operations for mobile application-based vehicle diagnostics associated with receiving vehicle information derived from vehicle data obtained from a diagnostic dongle communicating with a vehicle electrical system while traversing along a drive-through facility. The operations include scanning a code associated with vehicle data retrieved from the vehicle; communicating a unique identifier associated with the scanned code to a remote server, the unique identifier being used to facilitate an association between the mobile communication device and a customer profile stored on the remote server; and facilitating access to vehicle-specific safety and maintenance information linked to the customer profile upon return of the dongle to a prescribed area at the drive-through facility.

The scanning step may include scanning a QR code located on a diagnostic report derived from the vehicle data. The diagnostic report may be a hard copy (e.g., printed) report, or a report displayed on a digital screen.

The operations of the mobile communication device may also include purchasing repair parts, scheduling a repair service, selecting a diagnostic service, such as a level of diagnostic scan (e.g., superficial scan, deep scan, system-specific scan, etc.).

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a drive-through or stop-and-go diagnostic system and methods, and is not intended to represent the only forms that may be developed or utilized. The description sets forth the various structure and/or functions in connection with the illustrated embodiments, but it is to be understood, however, that the same or equivalent structures, methods and/or functions may be accomplished by different embodiments, in relation to different applications, that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
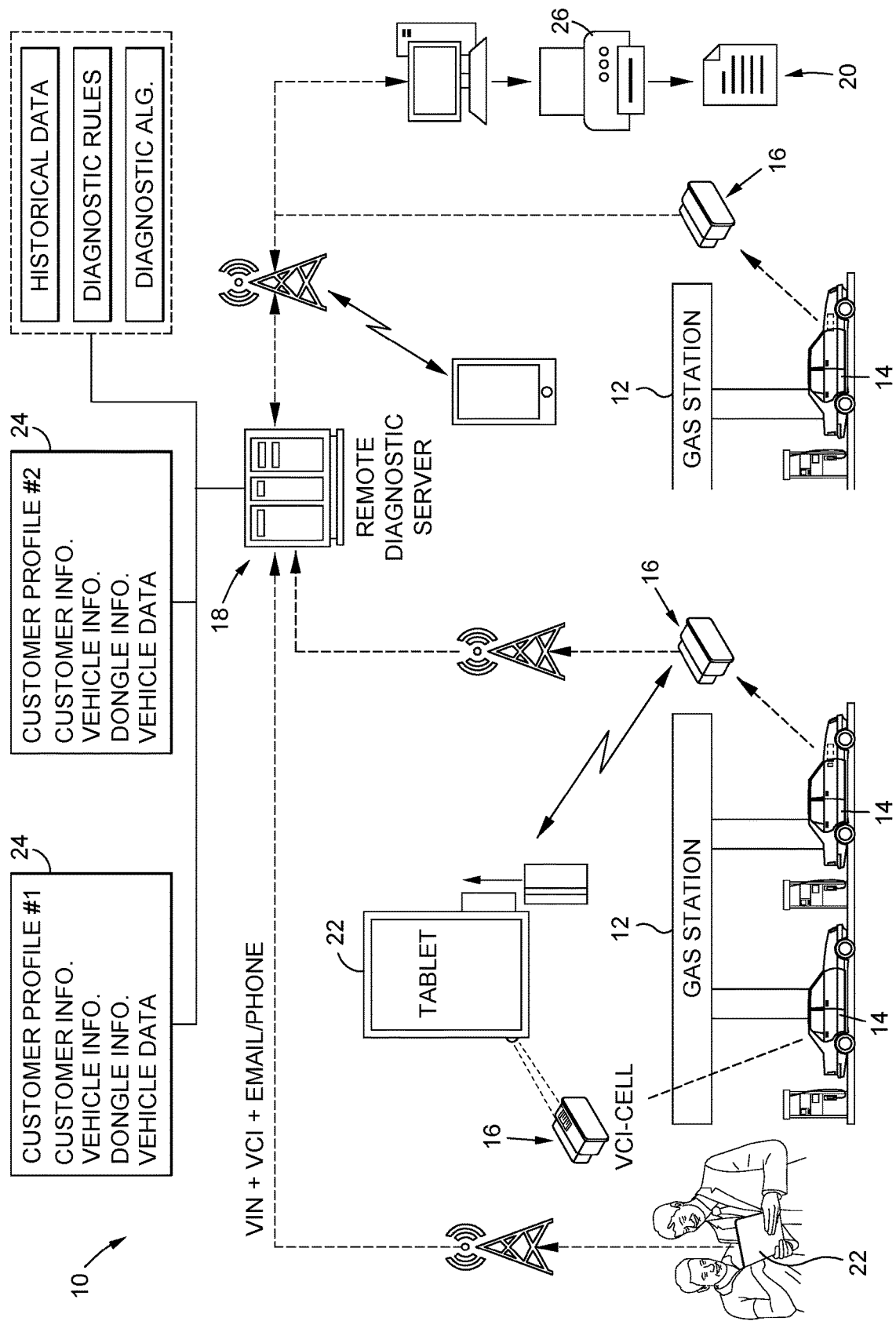
FIG. 1 is a diagram of an exemplary diagnostic system configured for implementation at a gas station.
Figure 2:
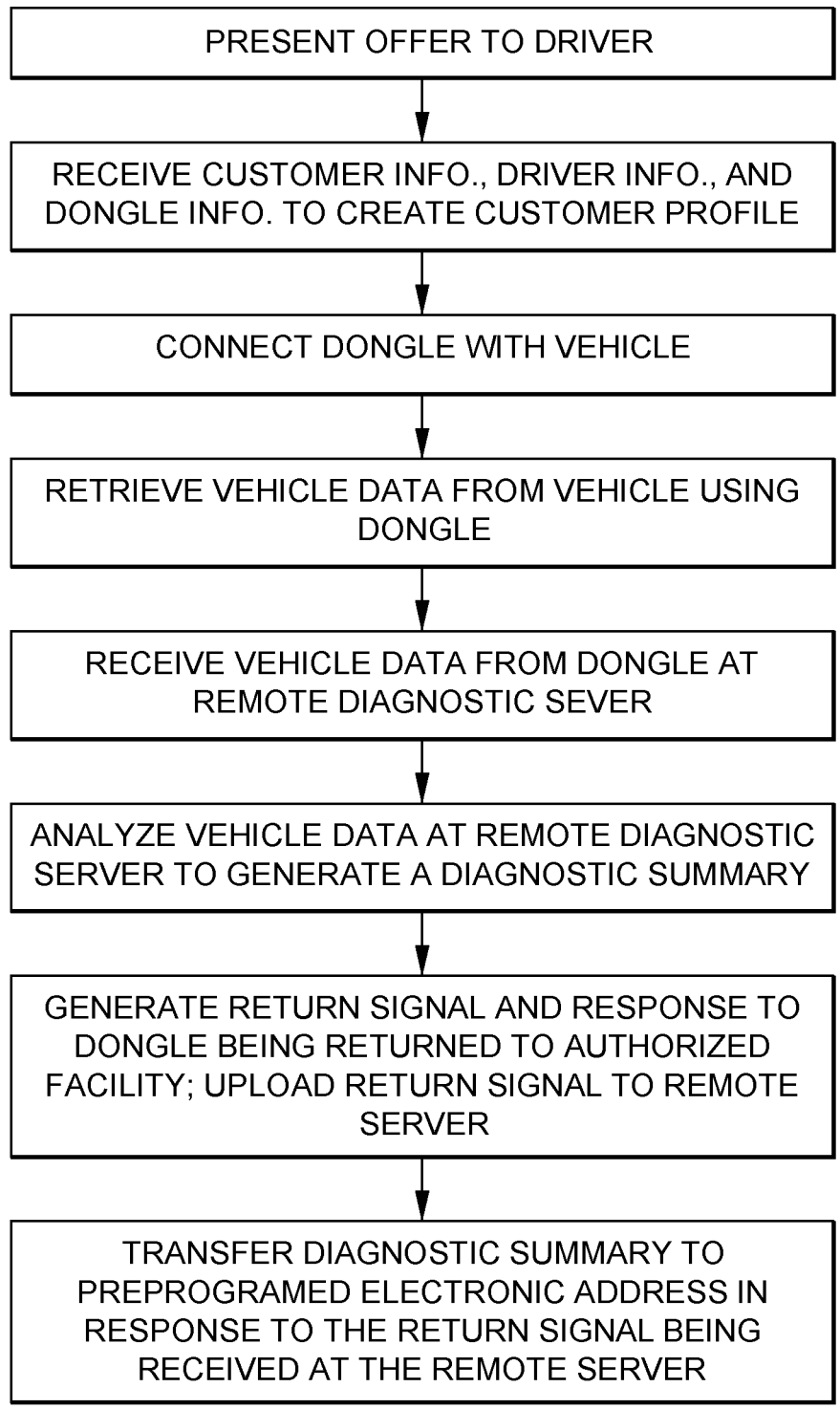
FIG. 2 is a flow chart of an exemplary diagnostic methodology capable of being incorporated into a gas station.

Referring now to FIG. 1, wherein the showings are for purposes of illustrating a preferred embodiment of the present disclosure, and are not for purposes of limiting the same, there is depicted a schematic of a diagnostic system 10 configured for integration into a gas station 12 or other facilities that may be routinely visited by a vehicle 14. The system 10 may be configured to allow a diagnostic dongle 16 to be provided, or made available to the driver of a vehicle 14 while the vehicle 14 is temporarily stopped at the gas station 12. The dongle 16 may be connected to the diagnostic port on the vehicle 14 while the vehicle 14 is located at the gas station 12, and a customer profile may be created and correlated to the dongle 16, to the customer and the customer's vehicle 14. The dongle 16 may remain connected to the vehicle 14 when the vehicle 14 leaves the gas station 12 and is driven during the normal course of operation. The dongle 16 may regularly retrieve data from the vehicle 14 and upload the data to a remote diagnostic server 18 for analysis. Upon returning to the gas station 12 (or a related facility), the driver may return the dongle 16 and obtain a diagnostic report 20 based on an assessment of the diagnostic data retrieved by the dongle 16, and which may identify possible diagnostic issues with the vehicle 14 along with one or more likely fixes or solutions which may correct the diagnostic issues. Alternatively, the diagnostic report 20 may be communicated to an electronic address associated with the customer profile/dongle. Should the customer fail to return the dongle within a prescribed period or should the customer choose to keep the dongle, a fee can be charged to the customer.

The stop-and-go diagnostic system 10 may allow drivers to quickly and easily obtain diagnostic hardware and diagnostic results during a routine visit to a gas station 12 or other regularly visited facility. Therefore, a driver may not be required to make a dedicated trip to a repair shop for diagnostic information.

It is contemplated that the gas station 12 associated with the diagnostic system 10 may be a full-service gas station, wherein an employee of the gas station 12 may pump the gas, or a self-service gas station, wherein the driver may pump the gas. As will be explained in more detail below, while the vehicle 14 is at the gas station 12, the driver may be offered to participate in a vehicle diagnostic method wherein the driver may be provided with the diagnostic dongle 16 during the initial visit to the gas station 12. The dongle 16 will remain plugged into the vehicle 14 to retrieve data from the vehicle 14 and upload the data to a diagnostic server 18 for analysis. Upon returning to the gas station 12, or a related location, the driver may return the diagnostic dongle 16 and receive a diagnostic report 20 which may identify one or more diagnostic issues that may be present and/or one or more predictive diagnostic issues that may be likely to arise in the near future.

While the vehicle 14 is at the gas station 12, the driver may be presented with an offer and explanation of the diagnostic services. The offer may be presented in a video located on a hand-held tablet 22 operated by an attendant, on signage located near the gas pump, or on a display screen incorporated into the gas pump. The driver may be provided with details of the diagnostic services, including the use of a diagnostic dongle 16, and possible levels of diagnostics that may be available, as will be described in more detail below.

If the driver is interested in the offered diagnostic services, a customer profile 24 may be created for the customer at a remote server 18. The customer profile 24 may include customer information, such as the customer's name, address, payment information (e.g., credit card information), level of diagnostics selected, vehicle information (e.g., vehicle identification number), and information associated with the dongle 16 connected to the driver's vehicle. In this regard each dongle 16 may be associated with a unique identifier, such as an electronic identification number, barcode, or QR code, which may be entered or scanned at the time of creating the customer profile 24. The attendant may use the handheld device 22 to scan or enter the information, which may be uploaded from the handheld device 22 to the remote server 18, where information associated with the customer profile 24 may be stored. The vehicle identification information may be entered into the customer profile by scanning a visual code on the vehicle, or manually entered by the attendant. In the case of a full-service gas station, the customer may be located in the vehicle while the customer profile is created by the attendant. At a self-service station, the customer may be pumping gas while the profile is created by an attendant, or the profile may be created by the customer either before or after the gas is pumped.

It is contemplated that in some instances, a customer profile may already exist if the customer has already visited the facility for non-diagnostic services or transactions, e.g., to pump gas, car wash, oil change, etc. The customer profile may have been previously created by the customer entering customer identification information online, via an app., or entered by an attendant at the facility. If the customer profile already exists, the existing customer profile may be linked or updated to include any additional information needed for the diagnostic services (e.g., dongle information, vehicle information, selected diagnostics, etc.).

To facilitate display of information as well as retrieval and entry of dongle identification information, vehicle identification information, and customer information, the handheld communication device 22 may include a display screen to display any videos, pictures, schematics, reports, or other information associated with the diagnostic services. The handheld electronic device 22 may also include a camera to capture images, such as images of the vehicle 14, the physically displayed VIN on the vehicle 14, the license plate, or information from the customer, such as the customer's driver's license or credit card. It is contemplated that the handheld electronic device 22 may be operatively associated with optical character recognition (OCR) software capable of extracting information from pictures captured by the camera. In this regard, the VIN may be extracted/derived from a picture of the vehicle 14, the customer's address may be extracted/derived from a picture of the customer's driver's license, etc. The OCR software may be stored locally on the handheld electronic device 22, or alternatively, on a remote computer accessible by the handheld electronic device 22.

The handheld electronic device 22 may also include a scanner for scanning a barcode on the dongle 16, the vehicle, or the driver's license, etc. Furthermore, the handheld electronic device may include a magnetic card reader or chip reader to read information from a credit card or driver's license.

It is further contemplated that the handheld electronic device 22 may include a transceiver to facilitate communication with one or more remote devices, computers, servers, etc. In this regard, the transceiver may be capable of short-range wireless communication (e.g., Bluetooth™) with devices in close proximity, such as a smartphone of the attendant or customer, and/or long-range wireless communication (e.g., cellular communication or WiFi communication) with more remote devices, such as a remote diagnostic server 18.

Although the foregoing describes various features and functions as being associated with a handheld electronic device 22, it is also contemplated that the features and functionality may be incorporated into a kiosk or hardware incorporated into the gas pump. Furthermore, the features and functions may be configured for operation with, or without, a gas station attendant. In other words, the diagnostic services may be associated with full-service (e.g., attendant-operated or assisted) or self-service (e.g., customer operated).

Once the customer profile is set up, the dongle 16 may be connected to the customer's vehicle 14 by plugging the dongle 16 into the diagnostic port on the vehicle 14. The dongle 16 may be plugged in by the attendant, the driver, or a passenger in the vehicle 14. When the dongle 16 into the diagnostic port on the vehicle, the dongle 16 may be capable of communicating with one or more vehicle electronic control units (ECUs), vehicle systems, or sensors. Necessary communication protocols may be preloaded on the dongle 16, or downloaded onto the dongle 14 to configure the dongle 16 to the particular vehicle 14.

Although the foregoing describes the dongle 16 as being plugged into the diagnostic port on the vehicle 14, it is contemplated that the dongle 16 may be capable of wireless communication with one or more vehicle systems, and thus, not require physical connection with the diagnostic port on the vehicle 14. It is also contemplated that the user's smartphone may also be able to wirelessly communicate with the vehicle to obtain certain vehicle data that may be useful to facilitate certain functionalities described herein, and as such, may be a "dongle."

After the dongle 14 has been connected to the vehicle 14, the initial customer setup is completed and the driver may leave the gas station 12. In this respect, the initial customer setup for the diagnostic service may be designed to take place while the customer's vehicle 14 is filled with gas, and be completed in approximately the time required to fill the tank with gas. Thus, the initial customer setup may be streamlined and may not require considerable extra time out of the customer's day.

As the vehicle 14 leaves the gas station 12 and is driven around in the normal course of operation, the dongle 16 may periodically retrieve data from the vehicle 14. The retrieval of data may occur according to preset timing parameters (e.g., every hour) and/or in response to certain operational thresholds being met, such as every time the vehicle 14 starts, every time the vehicle 14 passes a speed threshold, etc. It is also contemplated that retrieval of data may be made in response to a request by the remote diagnostic server 18.

When data is retrieved, it may be temporarily stored in a memory circuit located on the dongle 16, and then uploaded to the remote diagnostic server 18 (e.g., using a local area network, e.g., WiFi, or a cellular circuit in the dongle 16) for diagnostic analysis. Upon being received at the server 18, the diagnostic data may be analyzed at the diagnostic server 18 and a diagnostic summary may be produced. The diagnostic analysis may include a comparison of the retrieved diagnostic data with historical diagnostic data at the server 18 and identifying the possible solution association with the historical data that most closely corresponds to the retrieved diagnostic data. It is also contemplated that the diagnostic analysis may be facilitated through the use of one or more diagnostic algorithms stored at the server 18, or through the use of machine learning/artificial intelligence resources. For more information regarding the use of machine learning/artificial intelligence, please refer to U.S. Pat. No. 11,915, 534, entitled Vehicle Diagnostics With Intelligent Communication Interface, the contents of which are expressly incorporated herein by reference. The diagnostic summary produced via the diagnostic analysis may be updated as new data is received at the server 18 from the vehicle 14. In this regard, the diagnostic assessment may be an iterative process.

In addition to identifying the most likely diagnostic solution, the processing at server 18 may also include providing additional information that may be vehicle-specific or information related to the diagnostic summary/report. For instance, the server 18 may include a maintenance database having vehicle-specific safety and maintenance information, such as vehicle-specific maintenance schedules (such as suggested by the OEM), recalls, technical service bulletins (TSBs), replacement schedules of consumables (such as windshield wipers). The maintenance database may also include information that can be derived from vehicle data or vehicle information accessible from the diagnostic port on the vehicle. For instance, certain maintenance schedules may be associated with particular mileages, and retrieval of the vehicle's particular mileage may be available through the OBD port on the vehicle. Thus, the dongle 16 may be capable of accessing information that may be used not only for diagnostic purposes, but also for accessing and deriving vehicle-specific maintenance and service information. The server 18 may also be capable of identifying and costing of needed replacement parts and repair services, predicting future repairs that the vehicle 14 is likely to need over a specified period, etc. Implementation of such services is described and claimed in U.S. Pat. No. 7,734,390, entitled Process for Use of Automotive Diagnostics Console to Diagnose Vehicle, U.S. Pat. No. 9,177,428, entitled Predictive Diagnostic Method, U.S. Pat. No. 9,824,507, entitled Mobile Device Based Vehicle Diagnostic System, U.S. Pat. No. 10,462,225, entitled Method and System for Autonomously Interfacing a Vehicle Electrical System of a Legacy Vehicle to an Intelligent Transportation System and Vehicle Diagnostic Resources, the contents of each of the foregoing being expressly incorporated herein by reference.

According to one embodiment, the diagnostic summary (e.g., diagnostic report) may remain at the server 18 until the driver returns to the gas station 12 or a related facility and returns the dongle 16. The related facility may include another gas station 12 or any other facility having an association with the diagnostic services. The other facility may include, but is not limited to, a carwash facility, a vehicle repair facility, a vehicle parts facility, a smog check facility, a fast-food restaurant, a shopping center, etc. The dongle 16 may be returned to the attendant or dedicated structure (e.g., kiosk) which can recognize the returned dongle 16 and generate a return signal in response to receiving the dongle 16. In this regard, a barcode on the dongle 16 may be scanned or a unique ID associated with the dongle 16 may be entered into the handheld electronic device 22 operated by the attendant, which in turn, may generate the return signal in response to scanning of the barcode or entry of the unique ID. In this regard, the return signal may be generated when the dongle 16 is returned according to a defined return procedure.

The return signal generated at the gas station may be uploaded to the remote server 18. Upon receiving the return signal, the remote server 18 may transmit the diagnostic summary to a preprogrammed address, which may include but is not limited to, a printer 26 located at the gas station 12, an email address associated with the customer or a phone number. The diagnostic summary may provide the user with the ability to seek out repairs or perform maintenance on the vehicle to maintain vehicle health in a manner which does not require significant disruption to the normal operation and maintenance of the vehicle 14.

According to one embodiment, if no return signal is generated after a prescribed period of time (e.g., 7 days), the system 10 may be configured to send an alert signal to the driver with instructions to return to the dongle 16 to an authorized facility within a certain time window (e.g., 2 days). If the dongle 16 is not returned, the driver may be automatically charged for the cost of the dongle 16. Once payment for the dongle 16 is complete, a purchase signal may be sent to the server 18. In response to receiving the purchase signal, the server may send out the diagnostic summary to the driver (e.g., sent via email or text to the driver). In this regard the purchase signal is similar to the return signal, as it may trigger a similar action at the server 18.

Figure 3:
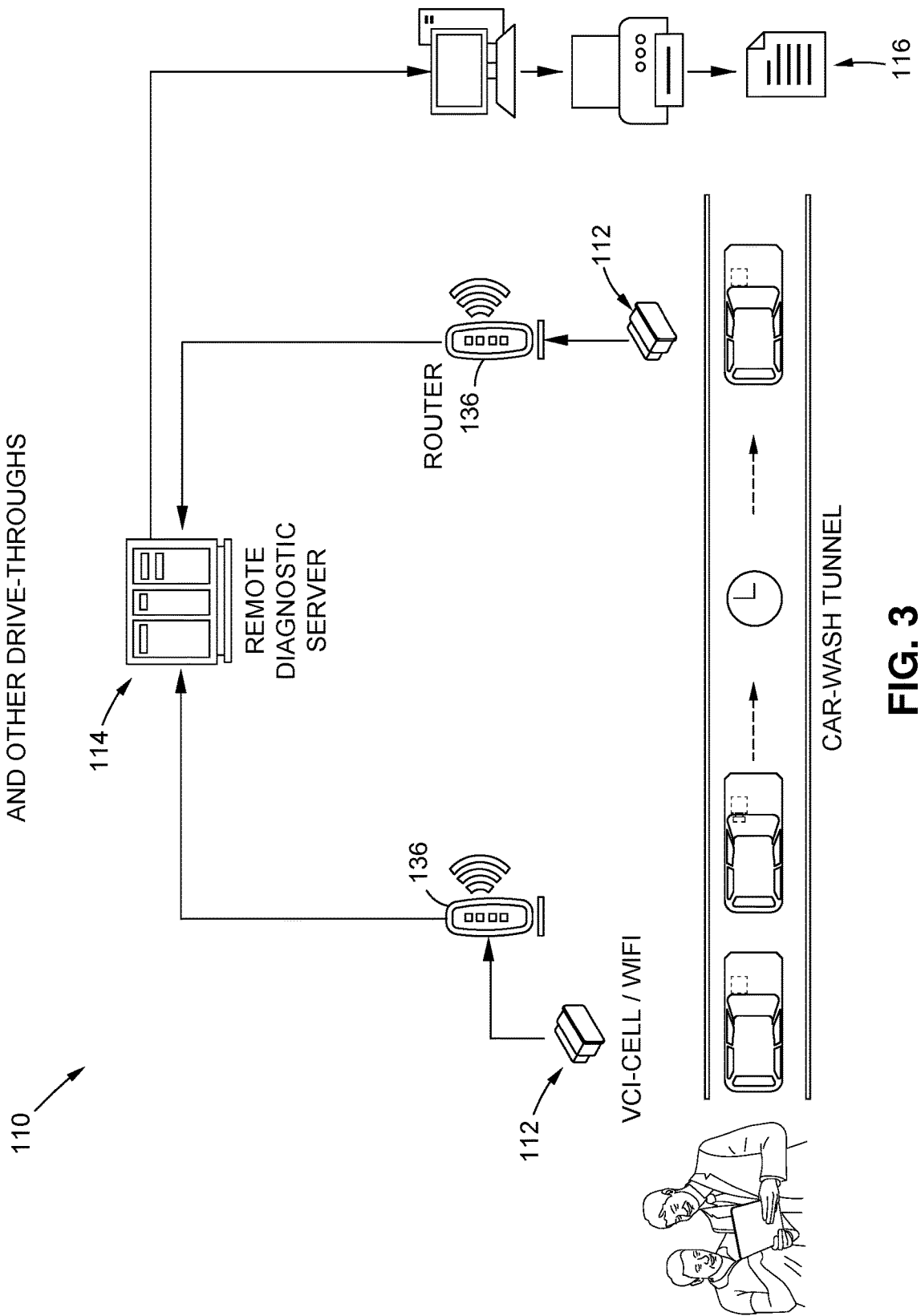
FIG. 3 is a diagram of an exemplary diagnostic system for implementation at a drive-through carwash.

In addition to the stop-and-go diagnostic system 10 described above, according to another aspect of the present disclosure, and referring now to FIG. 3, there is depicted a schematic view of an exemplary diagnostic system 110 and related methodology for implementation in a carwash or other drive through facilities. Customers of the carwash may be temporarily provided with a scan tool 112, which may be plugged into the vehicle diagnostic port to access diagnostic data on the vehicle while the vehicle passes through the carwash. As described further below, the diagnostic data may be uploaded to a remote server 114, which may analyze the data and generate a diagnostic summary. The diagnostic summary 116 may be provided to the customer's smartphone or provided via a printout at the carwash facility. Prior to leaving the carwash facility, the customer may unplug the scan tool 112 and leave the scan tool 112 at the facility. It is contemplated that the printout may include a QR code that may enable downloading of a smartphone application (such as described in more detail below) that may provide access to an electronic version of the diagnostic summary, as well as providing additional diagnostic information, such as future recalls, TSBs, carwash reminders, oil change reminders etc.

In this regard, a primary distinction between the above-described gas station embodiment, and the carwash embodiment, is that in the gas station embodiment, the dongle may remain with the vehicle after the vehicle leaves the gas station, drives around, and returns to the gas station, presumably, several days later. In contrast, the carwash embodiment may be configured to complete the entire diagnostic in the time it takes the vehicle to pass through the carwash tunnel. Thus, in the carwash embodiment, the dongle may remain on the carwash property the entire time, and when the vehicle leaves the carwash, the dongle may have already been disconnected from the vehicle and returned to the carwash facility.

The drive-through diagnostic system 110 provides a driver with a quick and easy vehicle diagnostic summary 116 during the normal course of operating the vehicle. In this regard, the user may not be required to purchase their own scan tool 112; rather, the scan tool 112 may be temporarily loaned to the user at the carwash facility, e.g., upon receipt of billing information and selection of a desired service. The scan tool 112 may be operatively linked to an on-board or location communication system and/or incorporate its own communications system for linking to a remote server 114.

Dedicated time for the diagnostic analysis may not be required, as the retrieval, analysis, and generation of the diagnostic summary 116 may be completed while the vehicle is passing through the carwash. As such, the drive-through diagnostic system 110 may increase accessibility and participation in vehicle diagnostics by a greater percentage of the driving community, which may lead to overall safer driving conditions.

In more detail, FIG. 3 shows various numbered milestones associated with the drive-through methodology. As described below, various details are provided as being associated with the drive-through system, although the methods, hardware, and software may also be applicable to the gas station embodiment described above.

The process may be initiated by presenting an offer for the diagnostic services to the customer at the carwash. The offer may be generated by an offer generating module and displayed at the point of sale for the carwash, such as a credit card reading machine or kiosk, or alternatively, it may be made in-person by a cashier. In this regard, the commercial transaction associated with the carwash may prompt the offer to be generated.

It is also contemplated that the offer may be presented on the customer's smartphone 118 (or other handheld electronic device), which may have a downloadable application ("app") 119 running on the smartphone 118. The app 119 may include geo-tracking capabilities that may identify when the vehicle is at the carwash facility and generate a prompt or notification on the user's smartphone 118 with the offer. The offer may include different levels of diagnostic analysis and related diagnostic summaries 116. For instance, a basic diagnostic analysis may simply include scanning for diagnostic trouble codes (DTCs) from the vehicle electronic control unit (ECU) 120 and the associated diagnostic summary 116 may simply indicate either the absence of codes or the presence of codes, along with the codes, the code descriptors, and/or identification of the vehicle defects indicated by the codes, for the specific vehicle being tested. The app may also facilitate automation of future scans. For instance, in the event a dongle is already plugged into the vehicle (as may be the case for a user who has a subscription to the drive-through facility), the geo-tracking capabilities of the smartphone may be used to initiate a scan when the vehicle is in the drive-through path. Alternatively, to the extent information can be wirelessly communicated from the vehicle to either the smartphone or the local area network of the facility, the presence of the smartphone in a geographic area associated with the facility may trigger the transmission of such information. In one embodiment, the geographic area associated with the facility may include the area proximate the facility where the smartphone can be paired with the local area network. For more information regarding potential functionality associated with the app, please refer to U.S. Pat. No. 11,915,534 entitled System, Method, and Computer Program Product For Providing Application-Based Assistance With Vehicle Emissions Testing Compliance, the contents of which are expressly incorporated herein by reference.

A more comprehensive diagnostic analysis may include retrieving a more comprehensive set of diagnostic data from the vehicle ECU 120, which may include DTCs, along with any live data associated with the DTCs, e.g., sensor data, and data from one or more vehicle systems 122, access to which may require one or more additional, vehicle specific, communication protocols.

The comprehensive diagnostic summary 116 may include a vehicle-specific diagnostic summary, including a listing of DTCs, associated live data, general health status indicator (e.g., red, yellow, green), a most likely vehicle fix for a detected malfunction, a listing of vehicle specific repair parts and/or repair procedures associated with the most likely vehicle fix, a listing of local repair shops that can complete the vehicle fix, scheduled maintenance, recalls, MIL status (e.g., check engine light), odometer reading, oil level, oil life, and a listing of local repair shops that can complete the vehicle fix.

The foregoing items may include information derived from the vehicle data retrieved from the vehicle. However, it is also contemplated that additional information may be presented based on readings, scans, images, etc., gathered from sources remote from the vehicle. For instance, the facility may include a tire tread scanner positioned such that the vehicle may be driven over the tire tread scanner to measure the current tire tread on the vehicle. The tire tread scanner may be in communication with the local area network to allow information from the tire tread scanner to be included in the diagnostic report. For instance, the tire tread information may include tread measurements and a color-coded indicator on the diagnostic report, with green being associated with good remaining tread life, yellow being associated with limited remaining tread life, and red being associated with tread life needing immediate or near-immediate replacement. It is also contemplated that one or more cameras can be located near the drive-through path to capture images of the vehicle to identify any body issues (e.g., dents, scratches, rust, etc.). The images may be quickly analyzed at an image analyzer, which may be on-site or remote, with the results of the analysis being included in the diagnostic report. The images may also be included in the diagnostic report to show the user where the body issues may be located. It is also contemplated that the images may be used to verify whether any damage occurred to the vehicle (or did not occur to the vehicle) as the vehicle traversed through the facility. In this regard, the camera(s) may be used to protect the facility against claims from a driver that damage to the vehicle occurred at the facility.

It is also contemplated that the drive through system may be able to provide information in the diagnostic report that relies on a combination of external equipment, as well as information from the dongle 112. For instance, the external resource may include a calibration target that may be used for detecting the effectiveness of an onboard sensor or camera. The target may be a known distance from the vehicle, and the dongle 112 may retrieve information detected from a sensor or camera on the vehicle which indicates the distance to the target, as measured by the sensor or camera. If the measured distance conforms to the actual distance by an acceptable amount, then the sensor may be assigned a passed status in the diagnostic report. However, if the measured distance does not conform to the actual distance by an acceptable amount, then the sensor may be assigned a failing status in the diagnostic report.

If the customer would like to purchase one of the offered diagnostic services, the customer may accept the offer and arrange for payment of the diagnostic services. The payment of the diagnostic services may be made in combination with the payment of the previous commercial transaction (e.g., the carwash), or the payment of the diagnostic services may be made separate from the payment of the previous commercial transaction.

Once the offer is accepted and payment is completed, the customer may complete a registration process during the customer's first visit. During subsequent visits, the customer may skip the registration process. During the registration, the customer may enter personal information, such as name and address; vehicle information, such as license plate, vehicle identification number, year, make, model, engine; and any preferred default settings, such as a preferred diagnostic analysis or a preferred destination or electronic address for the diagnostic summary 16. The electronic address may be an email address or telephone number to allow for texting or other short message service (SMS) of the diagnostic summary 116.

Once the customer has purchased a diagnostic service, the customer may be given a scan tool 112 or diagnostic dongle. The dispensing of the dongle and/or scan tool 112 may be done via a kiosk or other vending machine or other dispensing machine at the carwash facility. It is contemplated that the dispensing machine may be positioned adjacent the track along which a customer may drive the vehicle and such that the dispensed scan tool 112 may be accessible by the driver before entering the facility, e.g., as the driver rolls down the window. It is also contemplated that the scan tool 112 may be provided by an employee of the carwash, or provided in a bin or bucket that is accessible to the customer. It is also contemplated that the customer may already have a transponder, dongle, or other scan tool 112 in the vehicle. In this regard, the customer may own a scan tool 112 that may be operatively linked to the system 110 or a scan tool 112 may be provided for dedicated use by a customer that may be a regular visitor of the facility. For instance, the facility may offer a subscription service which includes a personal scan tool 112 for the subscribing customer.

Figure 4:
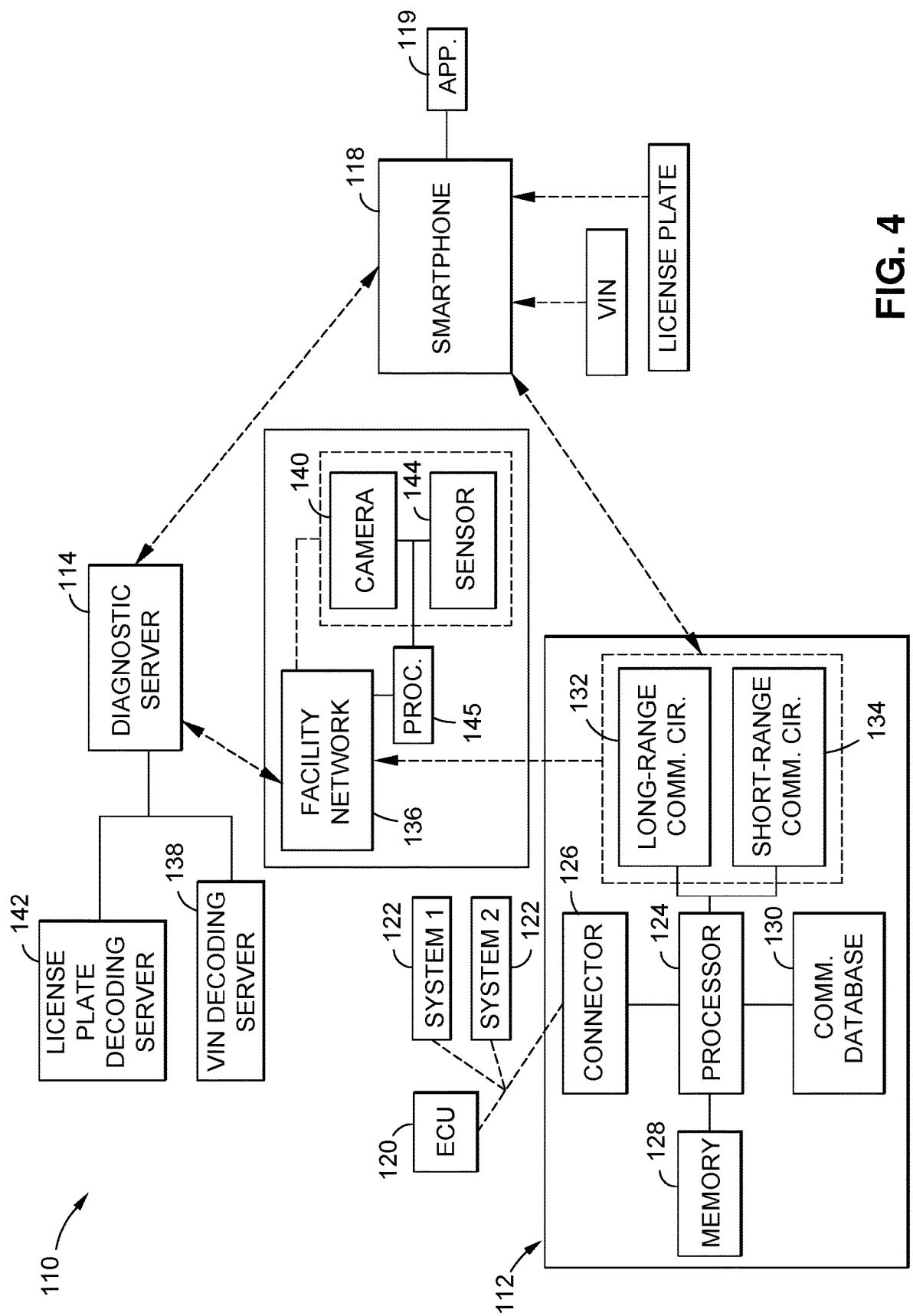
FIG. 4 is a schematic view of the diagnostic system.
Figure 5:
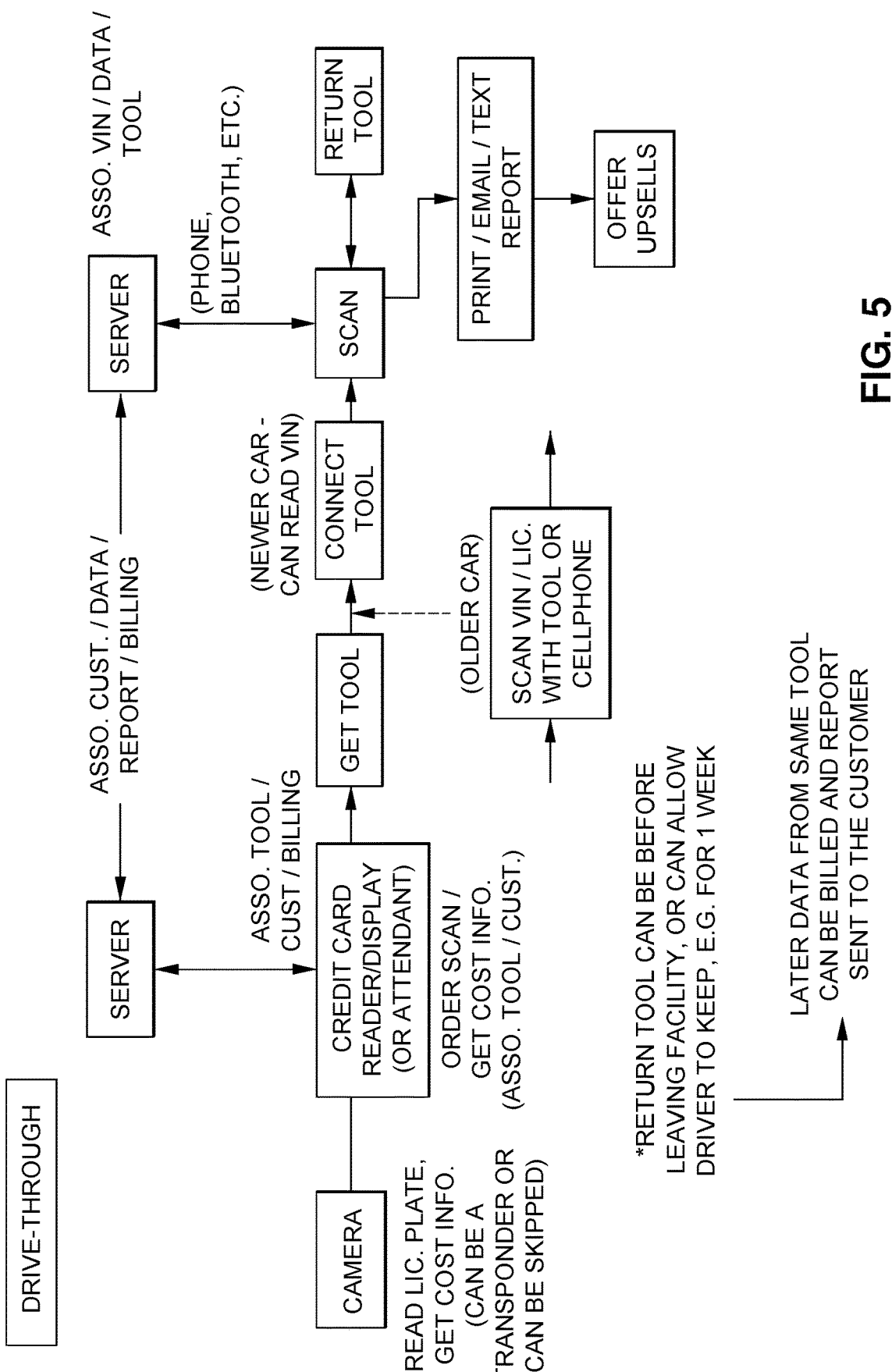
FIG. 5 is a flow chart of a diagnostic methodology implemented at a drive-through facility.
Figure 6:
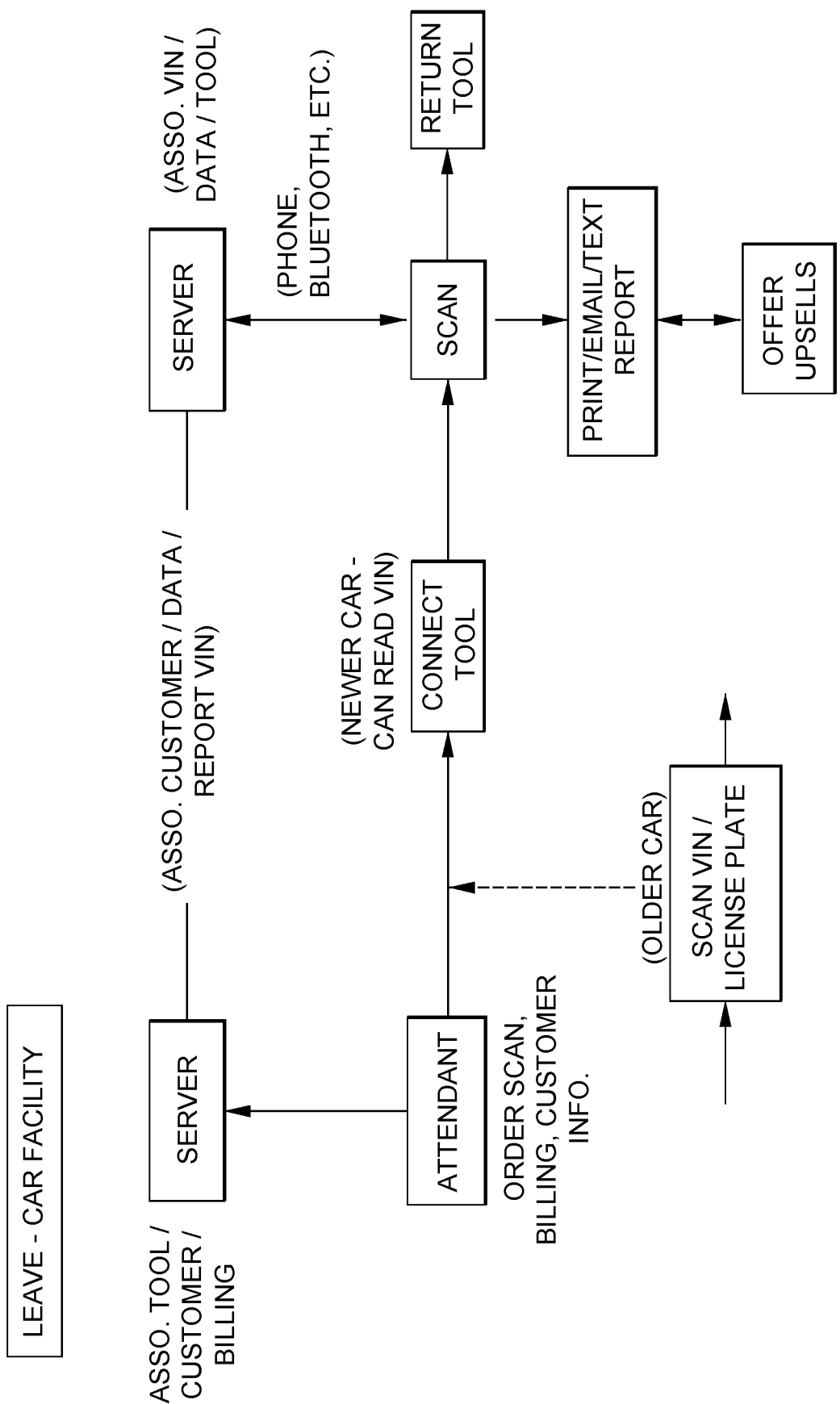
FIG. 6 is a flow chart of a diagnostic methodology implemented at a facility where a car may be left and remain stationary for a period of time.

Referring now to FIG. 4, the scan tool/dongle 112 may include a processor 124, a connector 126, a memory 128, a communications database 130, a long-range communication circuit 132, and/or a short-range communication circuit 134. The connector 126 may be plug connectable into the diagnostic port on a vehicle for communicating with a vehicle ECU 120 or vehicle system 122. The memory 128 may be capable of at least temporarily storing vehicle data and information retrieved from the vehicle after the scan tool 112 is connected to the vehicle. A unique electronic identifier (e.g., an alphanumeric code) may be stored on the memory 128 and may be used for identifying the specific scan tool 12 among a plurality of scan tools 112 that may be deployed at the carwash facility. The memory 128 may additionally include pre-programmed operating instructions stored thereon. The operating instructions may relate to the operational sequence associated with a customer's interaction with the scan tool 112, e.g., initially retrieve data, then upload data to a remote server 114, then delete any stored data prior to subsequent use. The communications database 130 may include communication protocols that may be used to communicate with a vehicle ECU 120 and/or one or more vehicle systems 122. The long-range communication circuit 132 may allow the scan tool 112 to independently communicate with a remote location, such as a diagnostic server 114, without relying on the communication resources of the carwash facility. An exemplary long-range communication circuit 132 may allow for communication over a cellular network or a V2X communication network. The short-range communication circuit 34 may allow for communication between the scan tool 112 and local electronic devices, such as the local communication network/system 136 at the carwash facility, as well as communication with the customer's smartphone 118. Exemplary short-range communication circuits 134 may allow for communication via WiFi®, Bluetooth®, etc.

The diagnostic system 110 may be configured to create an operative association between the scan tool 112 and the customer's vehicle to identify any communication protocols associated with the vehicle. In this regard, the communication protocols may be derived by polling the vehicle's ECU to derive an appropriate OBD protocol and/or by using the vehicle identification information, such as the vehicle's vehicle identification number (VIN) or license plate. For newer vehicles, the scan tool 12 may be capable of retrieving an electronic VIN from the vehicle ECU upon connection of the scan tool 112 to the ECU 120. The electronic VIN may be uploaded to a remote VIN decoding server 138 to determine the protocols associated with that vehicle. Once the protocol(s) associated with the subject vehicle are identified, a signal identifying the protocols or including the protocols may be communicated from the remote VIN-decoding server 38 to the scan tool 112. In other embodiments, the VIN decoding functionality may be integrated on the scan tool, dongle, or cellphone.

Alternatively, the carwash facility may include image capturing technology (e.g., a camera) 40 for capturing the license plate or VIN on the vehicle, and associating that information with customer information. The image capturing technology may be integrated into a kiosk or disposed on another structure that may be positioned adjacent the payment area or the track along which the vehicle moves, such that the license plate or VIN may be captured during the normal movement of the vehicle, e.g., movement along the drive-through track. That image or video may be used to by a remote license plate decoding server 142 or the VIN decoding server 138 to identify the protocols associated with the vehicle, e.g., the license plate or VIN. In this regard, the system 110 may include image processing capabilities, either at the decoding servers 138, 142 or elsewhere, for extracting the necessary information from the images or videos for use by the decoding servers 138, 142.

As an alternative, the user may manually enter vehicle identification information at some point during the visit to the carwash. The entry of the vehicle identification information may be done at the time of purchase, such as entry of the license plate or VIN into a kiosk or other machine at the carwash facility. It is also contemplated that the entry may be made via the app 119 running on the customer's smartphone 118. Any entry made at a kiosk or in the user's smartphone 118 may be uploaded to at least one of the decoding servers 138, 142 to identify the protocol(s) and other information associated with the customer or the customer's vehicle.

The scan tool 12 may also have a keypad or other user input feature which allows for entry of vehicle identification information directly to the scan tool 112. As noted above, vehicle identification information entered into the scan tool 112 may be processed locally by the scan tool 112 for deriving necessary protocols, or alternatively, uploaded to one or more of the remote decoding servers. It is also contemplated that the scan tool 112 may include a data port, such as a Universal Serial Bus (USB) port, that may allow for wired connection between the customer's smartphone 118 and the scan tool 112 such that the smartphone 118 may be used to enter data and information into the scan tool 12, or alternatively, to relay data and information to or from the scan tool 112.

Once the operative association is established, the system 110 may include tracking capabilities for tracking the scan tool 112 within the facility. In this regard, the carwash facility may include one or more sensors 144 which may receive a beacon or other identifying signal from the scan tool 112 as the scan tool 112 moves with the vehicle through the facility. In one embodiment, the unique electronic ID associated with the scan tool 112 may be used to track the scan tool 112 within the facility. The sensor(s) 144 may be in communication with one or more processor(s) 145, which may review the location information of the scan tool 112 from the sensor(s) 144 and generate a signal if the scan tool 112 moves outside of a predefined zone or area. For instance, if the scan tool 112 is moved outside of the carwash tunnel, the signal may be generated, which may create an alert on the user's smartphone 118 to return the scan tool 112.

The tracking capability may also be used as an alternative for creating the operative association between the scan tool 112 and the customer's vehicle. In this regard, as noted above, the system 110 may be capable of identifying the position of the scan tool 112 within the facility. Furthermore, the system 110 may also include one or more cameras 140 within the facility to track the vehicles. Thus, the system 110 may create an operative association by identifying similarly positioned scan tools 112 and vehicles. Once the operative association is created, the communication protocols may be determined, and utilized as described above.

The scan tool 112 may remain plugged into the vehicle's diagnostic port while the vehicle travels through the carwash tunnel. In this regard, the vehicle may be placed in neutral and the carwash facility may include a guide rail and rollers or other vehicle pushing devices that move the vehicle through the tunnel at a prescribed speed. While the scan tool 112 is connected to the vehicle, the scan tool 112 may communicate with the ECU and/or vehicle system(s) to retrieve and process the diagnostic data. This may include diagnostic trouble codes (DTCs), live data, PID data, sensor data, etc.

The retrieved diagnostic data may be uploaded to a remote diagnostic server 114 via the facility's communication network 136 or via other communication pathways, e.g., directly from the scan tool 112 using a local communication circuit, the long-range communication circuit 32, or relayed via the user's smartphone 118.

The diagnostic data may be analyzed at the diagnostic server 114 and a diagnostic summary 116 may be produced. In addition to identifying the most likely diagnostic solution, the processing at the server 114 may also include identifying and costing of needed replacement parts and repair services, predicting future repairs that the vehicle is likely to need over a specified period, etc., as described in more detail above. As noted above, the detail and complexity of the diagnostic summary 116 may vary depending on the level of diagnosis selected by the customer. The diagnostic summary 116 may be sent from the diagnostic server 114 to a printing terminal or display terminal at the carwash facility, or to the user's smartphone 118. The summary 116 may also be stored at the diagnostic server for subsequent retrieval by the customer. In this regard, the diagnostic summary 16 may be retrieved using the customer's login credential or by entry of other unique information associated with the customer, such as the vehicle identification information.

As the vehicle approaches the end of the carwash tunnel, or after the vehicle as left the tunnel, e.g., after vacuuming the vehicle, the customer may unplug the scan tool 112 and return the scan tool 112 to the carwash facility. The carwash facility may include a collection bin or other collection area that customers may place the scan tool 112. If the customer does not return the scan tool 112, the system 110 may further be configured to assess a fee to the customer's account. Furthermore, it is contemplated that the scan tool 112 may include a GPS circuit for tracking its own location. The scan tool 112 may be capable of locking itself or otherwise disabling itself if the scan tool 112 is removed from the location associated with the drive-through facility, so as to discourage removal of the scan tool 112 from the facility.

In one embodiment, the relaying of signals including data and information between the scan tool 112 and the remote servers 114, 138, 142 may be done independent of the computer system or network 136 at the facility. In this regard, the system 110 may utilize the communication capabilities of the customer's smartphone 118 to relay the signals. It is also contemplated that the system 110 may include dedicated routers, modems, or other communication hardware at the facility that is separate from the computer system associated with the day-to-day operation of the facility.

In another embodiment, it is contemplated that the relaying of signals between the scan tool 112 and the remote servers 114, 138, 142 may be facilitated by the computer systems/hardware (e.g., local area network/communication system) at the facility. A facility's communication system may include any single device, or plurality of devices, that relay information between the dongle and a remote location (such as a remote server), as well as relaying information to and from a user's handheld electronic device, and/or a user's vehicle. As such, the communication system may include a base station/router, a mesh communication network communicating with the base station, one or more handheld electronic devices associated with the facility, also communicating with the base station, with the base station being configured to facilitate long-range communications with remote servers, databases, etc., via a cellular network, or other long-range communication modalities.

If the facility is capable of providing replacement parts or performing repair services, the diagnostic summary may include a parts identifier or a repair identifier to allow a customer to purchase the part or repair directly from the facility. If the relaying of signals between the scan tool and the remote servers 114, 138, 142 is done independent of the facility's computer system, such direct ordering of the repair parts or services may require additional data processing and/or communication links.

Figure 8:
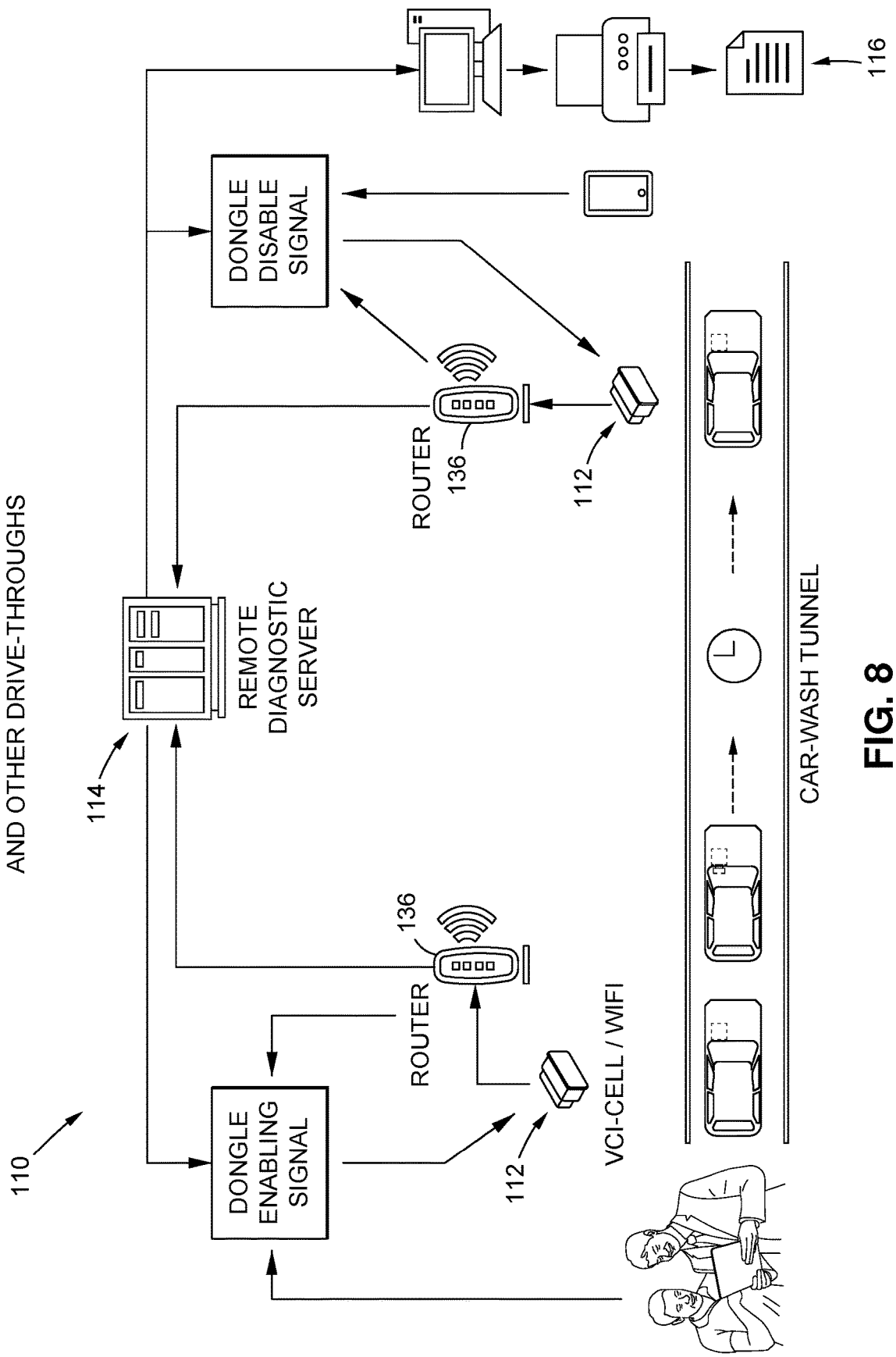
FIG. 8 is a diagram of an exemplary diagnostic system including a function-enabling dongle for implementation at a drive-through carwash.

Various aspects of the present disclosure may pertain to enabling or disabling certain functionalities of the scan tool/dongle 112 when certain conditions are met. The conditions may include receiving payment, or an agreement to pay, from the user. In this regard, the processor 124 of the dongle 112 may receive a dongle enabling signal from a dongle enabling device and implement at least one dongle functionality in response to receipt of the dongle enabling signal. As shown in FIG. 8, the dongle enabling signal may be sent from the local area network of the facility, which may broadly refer to a communication base station/router at the facility, a device being operated by an employee of the facility, or from the user's smartphone at the facility, or from a remote server that sends the signal through a resource at the facility. For instance, upon completion of payment, an employee of the facility may click an AUTHORIZE button on an electronic device (e.g., smartphone or tablet) operated by the employee, which may result in the dongle enabling signal being transmitted from the electronic device to the dongle 112. Alternatively, the employee may scan a unique barcode or QR code on the dongle 112 in response to receipt of payment, and the electronic device controlled by the employee may generate the dongle enabling signal, which may be communicated to the dongle 112. The dongle enabling signal may also be generated at a kiosk or paystation in response to receipt of payment. It is contemplated that the dongle enabling signal may be communicated to the dongle 112 and/or a remote server that may implement certain functions associated with the dongle 112, such as analysis of diagnostic data retrieved by the dongle 112. In this regard, the generation of the dongle enabling signal may allow the intended diagnostic process to proceed as intended, while absence of the dongle enabling signal may disrupt at least one function in the process, either at the dongle 112, or the server, or some other related device, to disrupt the process.

The functionality that may be implemented in response to receipt of the dongle enabling signal may include retrieval of data from the vehicle, upload of data from the vehicle, analysis of the vehicle data, or receipt of the diagnostic summary.

In one embodiment, the dongle 112 may be configured to continue implementation of the dongle functionality for a prescribed period of time after having received the dongle enabling signal. For instance, if the typical drive-time through the drive-through path is 2 minutes, the dongle 112 may be configured to disable any enabled functionality after 3 minutes pass to protect against stealing of the dongle 112. However, the system may be capable of sending multiple dongle enabling signals to the dongle 112 to allow the dongle functionality to remain implemented. In an alternative embodiment, the dongle 112 is relatively unsophisticated and relies on instructional signals received from the communication system. In this regard, the communication system may include a processor or controller which communicates dongle enabling signals to actuate functionalities on the dongle, as well as dongle disabling signals to deactivate functionalities on the dongle. The communication system may be configured to control the functionalities of multiple dongles at any given time, through the communication of several dongle enabling signals and several dongle disabling signals. The dongle disabling signals may be generated in response to any number of triggering events. In one embodiment, the dongle disabling signal may be triggered in response to returning of the dongle by the user. When the dongle is returned, a dongle return signal may be generated by the receiving device, such as a kiosk that receives the device, or a handheld communication device that may scan the dongle upon receipt or receive an operator input indicative of receipt of the dongle in a prescribed return area. The dongle return signal may be received by a controller (e.g., a processor in a base station) of the communication system, which may prompt generation of a dongle disabling signal to disable any functionalities of the dongle while it remains in a hopper or other bin between uses. In another embodiment, the dongle disabling signal may be triggered in response to a prescribed period of time passing after generating of the dongle enabling signal. For instance, the dongle disabling signal may be generated 3 minutes after the dongle enabling signal.

As noted above, although the foregoing describes the drive-through diagnostic system 10 as being implemented in a carwash, it is contemplated that other embodiments of the drive-through diagnostic system 110 may be incorporated into other drive-through environments. For instance, fast-food drive through, pharmacy drive-through, banking drive-through, etc., may be suitable environments for the drive-through diagnostic system 110. It is also contemplated that the diagnostic system 110 may be implemented at an oil-change facility.

Figure 7:
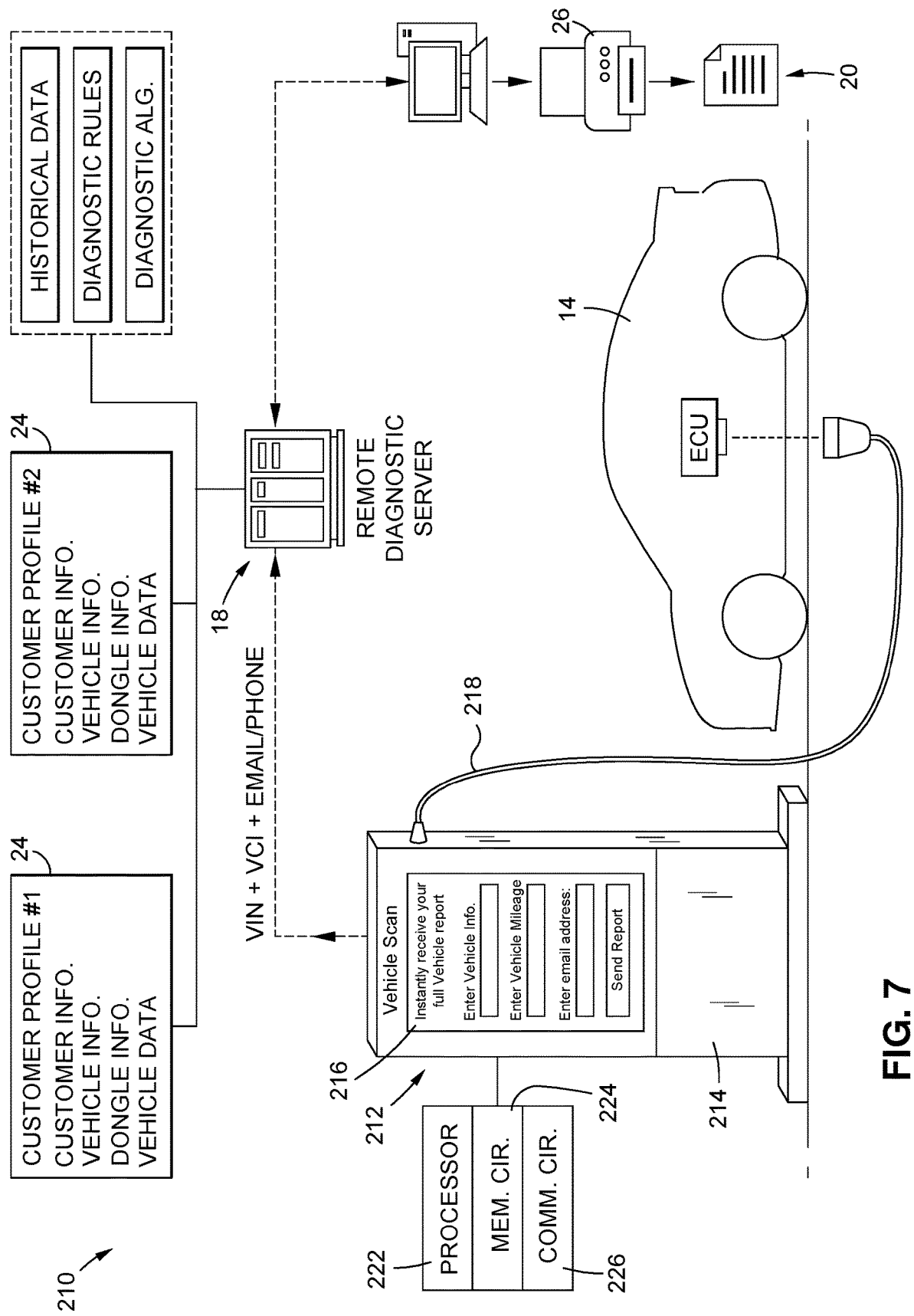
FIG. 7 is a diagram of an exemplary vehicle diagnostic system including a kiosk for retrieving data from the vehicle and providing a user interface to a customer.

Referring now to FIG. 7, there is depicted another embodiment of a diagnostic system 210, which utilizes a kiosk 212 to retrieve data from the vehicle 14. The kiosk 212 may be used in place of the dongle to communicate with the vehicle 14 for purposes of retrieving data and information from the vehicle 14. The kiosk 212 may also be capable of providing an easy-to-use user interface to receive data and information from the customer, provide instructions to the customer, and display diagnostic results to the customer.

The kiosk 212 may generally include a housing 214, a user interface 216, a cable 218, and a cable head 220. The housing 214 may be formed of a weather-resistant material, such as metal, plastic or the like, and capable of withstanding exposure to the elements (e.g., prolonged periods of sunlight, rain, sleet, snow, hail, etc.). The housing 214 may be anchored or secured to the ground. It is contemplated that the kiosk 212 may be located at a gas station, a car wash or other locations that are routinely visited during the course of operating a vehicle 14, such as a strip mall parking lot, office campus parking lot, an automotive parts store, an automotive repair shop, etc.

The user interface 216 may include a touchscreen, or a video screen with one or more buttons to allow a user to input information. The user interface 216 may be coupled to the housing 214 and may be located at a height that is easily reachable by an adult. The user interface 216 may be used by a user to create a customer account, enter customer identification information, enter vehicle identification information, enter vehicle operational information (e.g., mileage), and make a selection regarding desired diagnostic services.

The cable 218 may extend from the housing 214 and may terminate at the cable head 220, which may be plug connectable to a diagnostic port on the vehicle 14. Thus, information and data may be retrieved from the vehicle through the cable head.

The kiosk 212 may also include a processor 222, a memory circuit 224, and a communications circuit 226 located within the housing 214 to implement the functionalities of the kiosk 212. In this regard, the memory circuit 224 may, at least temporarily store, customer data, vehicle data and information, diagnostic algorithms, diagnostic databases, etc. The communications circuit 226 may be capable of facilitating communication between the kiosk 212 and one or more remote servers 18. The communications may be via hardwire connection, e.g., Ethernet, or via wireless connection, e.g., WiFi, cellular network, etc.

In use, a customer may approach the kiosk 212 and park the car next to the kiosk 212. The customer may interact with the user interface 216 to answer any prompts presented on the touchscreen. For instance, the user may be requested to enter vehicle information (e.g., VIN, year, make, model, engine, etc.), vehicle mileage, as well as customer information (e.g., customer email address). The kiosk 212 may communicate the entered information to the remote diagnostic server to either generate a customer profile, or access an existing customer profile. The kiosk 212 may obtain communication protocols, or diagnostic instructions from the diagnostic server based on the vehicle information and/or customer information received at the kiosk 212.

The user may plug in the cable head 220 to the diagnostic port on the vehicle 14. Instructions or guidance, such as a description or diagram of where the diagnostic port may be located on the vehicle 14, may be depicted on the user interface 216 to provide assistance to the user. After the cable head 220 is connected to the diagnostic port, vehicle data and vehicle information may be retrieved from the vehicle. It is contemplated that access to certain diagnostic information may require the car to be turned on and placed in park. The retrieval of vehicle data may occur autonomously in response to connection of the cable head 220 to the diagnostic port, or in response to the user providing a retrieval command via the user interface 216.

Vehicle information and vehicle data retrieved from the vehicle 14 may be temporarily stored on the memory circuit 224 of the kiosk 212, and then uploaded to the remote diagnostic server 18 via the communications circuit 226 for analysis. The results 20 of the diagnostic analysis may be sent to one or more locations, including the user interface 216, a display/terminal/printer 26 in an associated parts/repair store, the user's smartphone, etc. Along these lines, various levels of detail may be associated with the diagnostic results. The most detailed results may be available in the parts/service store, where an employee of the store may offer needed parts/services to complete any associated repairs. Furthermore, providing the detail in the parts/service store may incentivize the user to enter the store. A more general summary or report may be made available on the user's smartphone or on the user interface 216. Of course, in other embodiments more detailed summaries or reports may be provided to the user interface 216 or smartphone.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A drive-through diagnostic system for providing a user with vehicle-specific information while a vehicle traverses a path at a drive-through facility associated with a drive-through functionality, the drive-through diagnostic system comprising:
   a dongle configured to:
      facilitate connection with a vehicle electrical system to retrieve vehicle data therefrom;
      implement at least one dongle functionality in response to receipt of a wireless dongle enabling signal;
      remain in a disabled state unless and until the dongle receives the wireless dongle enabling signal, implementation of the at least one dongle functionality being disabled while the dongle is in the disabled state; and
      disable the at least one dongle functionality after a prescribed period of time passes subsequent to receipt of the dongle enabling signal; and
   a communication system configured to:
      communicate the wireless dongle enabling signal when the dongle is within a defined area associated with the drive-through facility; and
      generate a dongle return signal in response to return of the dongle to a prescribed return area, the generation of the dongle return signal being a precondition for transmission of a diagnostic report including the vehicle-specific information, the diagnostic report being derived from the retrieved vehicle data;
   the communication system and the dongle being configured to implement the at least one dongle functionality concurrently with the vehicle traversing the path at the drive-through facility associated with the first functionality.

2. The drive-through diagnostic system recited in claim 1, wherein the wireless dongle enabling signal is a WI-FI signal.

3. The drive-through diagnostic system recited in claim 1, wherein the wireless dongle enabling signal is a BLUETOOTH signal.

4. The drive-through diagnostic system recited in claim 1, wherein the communication system includes a handheld communication device capable of generating the wireless dongle enabling signal.

5. The drive-through diagnostic system recited in claim 4, wherein communication of the dongle enabling signal is prompted by an action by the handheld communication device.

6. The drive-through diagnostic system recited in claim 5, wherein the action by the handheld communication device includes scanning a code on the dongle by the handheld communication device.

7. The drive-through diagnostic system recited in claim 1, wherein the communication system is configured to transmit a long-range signal to a remote diagnostic server.

8. The drive-through diagnostic system recited in claim 7, wherein the long-range signal includes the dongle return signal being communicable to a remote diagnostic server configured to generate the diagnostic report.

9. The drive-through diagnostic system recited in claim 7, wherein the long-range signal includes the diagnostic report receivable from a remote diagnostic server.

10. The drive-through diagnostic system recited in claim 7, wherein the long-range signal is a cellular signal.

11. The drive-through diagnostic system recited in claim 1, wherein the at least one dongle functionality is a communication functionality.

12. The drive-through diagnostic system recited in claim 11, wherein the communication functionality is communication of vehicle data from the dongle.

13. The drive-through diagnostic system recited in claim 1, wherein the dongle is configured to continue implementation of the at least one dongle functionality for a prescribed period of time after having received the dongle enabling signal.

14. The drive-through diagnostic system recited in claim 1, wherein the communication system is configured to communicate a dongle disable signal to the dongle for disabling the at least one dongle functionality.

15. The drive-through diagnostic system recited in claim 14, wherein the dongle disable signal is communicated a prescribed period of time subsequent to the communication of the dongle enabling signal.

16. The drive-through diagnostic system recited in claim 1, wherein the communication system is configured to facilitate:
  access to a maintenance database having vehicle-specific safety and maintenance information; and
  delivery of the vehicle-specific safety and maintenance information from the maintenance database to a user device.

17. The drive-through diagnostic system recited in claim 16, wherein the vehicle-specific safety and maintenance information includes technical service bulletins (TSBs).

18. The drive-through diagnostic system recited in claim 16, wherein the vehicle-specific safety and maintenance information includes maintenance schedules.

19. The drive-through diagnostic system recited in claim 16, wherein the vehicle-specific safety and maintenance information includes at least one acceptable fluid level for a fluid system on the vehicle.

20. The drive-through diagnostic system recited in claim 1, wherein the prescribed period of time is commensurate in duration with commercial activity associated with the path at the drive-through facility.

21. The drive-through diagnostic system recited in claim 20, wherein the commercial activity is car-washing activity.

22. The drive-through diagnostic system recited in claim 20, wherein the commercial activity is vehicle-service activity.

23. A drive-through vehicle diagnostic method for implementing a dongle functionality concurrently with a drive-through functionality at a drive-through facility, the method comprising the steps of:
  receiving a dongle enabling signal emitted by a dongle enabling device, the dongle enabling signal being received at a dongle configured to be disposable in communication with a vehicle to retrieve vehicle data therefrom and configured to remain in a disabled state unless and until the dongle receives the wireless dongle enabling signal, implementation of at least one dongle functionality by the dongle being disabled while the dongle is in the disabled state;
  implementing the at least one dongle functionality on the dongle in response to receipt of the dongle enabling signal, the dongle being configured to be disposable in communication with a vehicle to retrieve vehicle data therefrom, the at least one dongle functionality selected from the list including:
    receiving vehicle data at the dongle; and
    uploading the vehicle data from the dongle to a remote device for diagnostic processing;
  disabling the at least one dongle functionality after a prescribed period of time passes subsequent to receipt of the dongle enabling signal, the disabling step being implemented at the dongle independent of any signal received by the dongle after the dongle enabling signal; and
  providing access to a diagnostic report derived from the retrieved vehicle data in response to receipt of the dongle according to a defined dongle return procedure.

24. The drive-through diagnostic method recited in claim 21, further comprising the step of receiving vehicle data at the dongle.

25. The drive-through diagnostic method recited in claim 24, further comprising the step of uploading vehicle data from the dongle.

26. The drive-through diagnostic method recited in claim 23, wherein the implemented at least one dongle functionality is implemented for a prescribed period of time.

27. The drive-through diagnostic method recited in claim 23, further comprising the steps of:
  detecting connectivity between the dongle and the vehicle; and
  generating an alert signal by the dongle when connectivity is detected and the dongle enabling signal has not been received.

28. A functionally-enablable vehicle diagnostic dongle configured for use with a dongle enabling device configured to generate a wireless dongle enabling signal associated with a defined area to facilitate implementation of a dongle functionality concurrently while a vehicle moves within the defined area to effectuate a functionality associated with the defined area, the dongle comprising:
  a vehicle communication port configured to be connectable with a vehicle to retrieve vehicle data therefrom;
  a remote communication circuit configured to send and receive signals to at least one remote device; and
  a processor in communication with the vehicle communication port and the remote communication circuit, the processor being configured to:
    receive the dongle enabling signal via the remote communication circuit from the dongle enabling device; and
    implement at least one dongle functionality in response to receipt of the dongle enabling signal, the at least one dongle functionality selected from the list including:
      receiving vehicle data at the dongle; and
      uploading the vehicle data from the dongle to a remote device for diagnostic processing;
    transition the dongle to a disabled state after a prescribed period of time passes after receiving the dongle enabling signal and keep the dongle in the disabled state unless and until the dongle enabling signal is received, implementation of the at least one dongle functionality being disabled while the dongle is in the disabled state.

29. The dongle recited in claim 28, wherein the processor is configured to implement the at least one dongle functionality for a prescribed period of time.

30. The dongle recited in claim 29, wherein the at least one dongle functionality is a communication functionality.

31. The dongle recited in claim 30, wherein the processor is further configured to disable the implemented at least one dongle functionality after the prescribed period of time passes.

32. A drive-through diagnostic system for providing a user with vehicle-specific information upon completion of the user traversing a path at a drive-through facility, the drive-through diagnostic system comprising:
  a dongle configured to be connectable with a vehicle electrical system to retrieve vehicle data therefrom, the dongle being configured to implement at least one dongle functionality in response to receipt of a wireless dongle enabling signal, the dongle further being configured to disable the at least one dongle functionality and assume a disabled state after a prescribed period of time passes subsequent to receipt of the dongle enabling signal and remain in the disabled state unless and until the wireless dongle enabling signal is received, implementation of the at least one dongle functionality being disabled while the dongle is in the disabled state;
  a remote server configured to receive the vehicle data retrieved from the dongle and generate a diagnostic report including the vehicle specific information; and a communication system configured to:
    communicate the wireless dongle enabling signal when the dongle is within a defined area associated with the drive-through facility; and
    generate a dongle return signal in response to return of the dongle, the generation of the dongle return signal being a precondition for transmission of the diagnostic report to a prescribed electronic address.

33. A non-transitory program storage medium on which are stored instructions executable by a processor or programmable circuit of a mobile communication device to perform operations for mobile application-based vehicle diagnostics associated with receiving vehicle information derived from vehicle data obtained from a diagnostic dongle communicating with a vehicle electrical system while traversing along a drive-through facility, the operations comprising:

scanning a first code associated with a diagnostic dongle to trigger generation of dongle enabling signal receivable by the dongle to enable at least one functionality on the diagnostic dongle;

disabling the at least one dongle functionality after a prescribed period of time passes subsequent to receipt of the dongle enabling signal at the dongle;

scanning a second code associated with vehicle data retrieved from the vehicle;

communicating a unique identifier associated with the scanned second code to a remote server, the unique identifier being used to facilitate an association between the mobile communication device and a customer profile stored on the remote server; and facilitate access to vehicle-specific safety and maintenance information linked to the customer profile upon return of the dongle to a prescribed area at the drive-through facility.

34. The non-transitory program storage medium recited in claim 33, wherein the step of scanning the second code includes scanning a QR code located on a diagnostic report derived from the vehicle data.

\* \* \* \* \*